Jan. 11, 1966  J. D. R. DELMOTTE  3,228,649
POROUS NORMALLY DRY NON-CONDUCTIVE MOLD
Filed Oct. 2, 1961  2 Sheets-Sheet 1

INVENTOR.
JEAN DESIRÉ RAYMOND DELMOTTE
BY
Andrew K. Jones
his ATTORNEY

Jan. 11, 1966         J. D. R. DELMOTTE         3,228,649
POROUS NORMALLY DRY NON-CONDUCTIVE MOLD
Filed Oct. 2, 1961         2 Sheets-Sheet 2
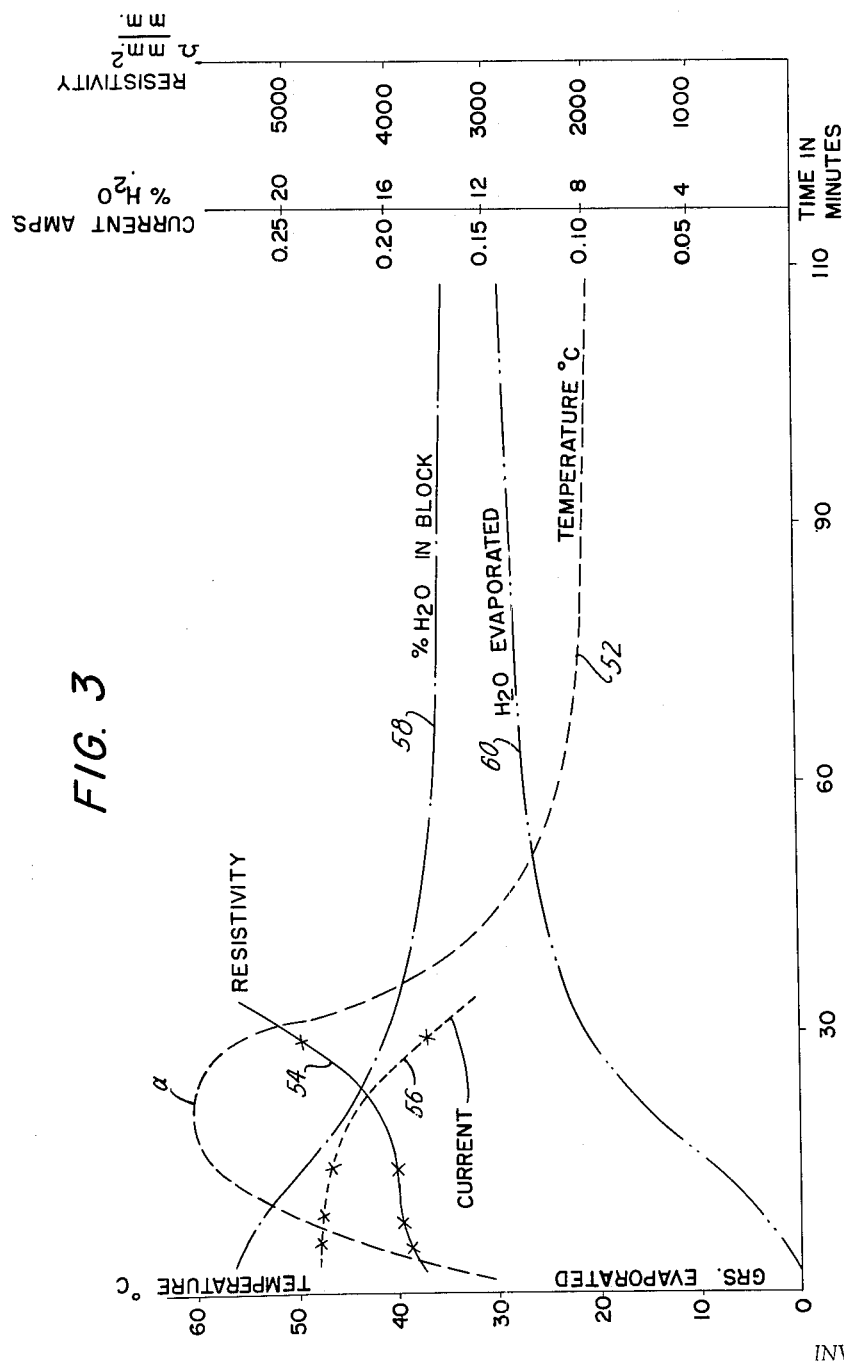
INVENTOR.
JEAN DÉSIRÉ RAYMOND DELMOTTE
BY
his ATTORNEY

United States Patent Office 3,228,649
Patented Jan. 11, 1966

3,228,649
POROUS NORMALLY DRY NON-CONDUCTIVE MOLD
Jean Désiré Raymond Delmotte, Houdeng-Aimeries, Belgium, assignor to American Radiator & Sanitary Corporation, New York, N.Y., a corporation of Delaware
Filed Oct. 2, 1961, Ser. No. 142,211
5 Claims. (Cl. 249—78)

The invention is specifically concerned with the treatment of barbotine, moist ceramic pastes and the like to form articles of manufacture such as wash basins, tanks and so forth.

The shaping of large quantities of ceramic pieces is generally accomplished by the use of molds or the like and if production is to be continuous, the molds are used over and over again.

It is conventional, in manufacturing the above-noted products, to use molds of porous material which absorb moisture from the substance being shaped and which are adapted to dissipate this moisture into the ambient atmosphere. However, if porous molds are to be used repeatedly, the need arises for evacuating moisture therefrom rapidly in order to expedite preparing the same for the next charge of substance to be shaped. With respect to this need, it is conventional to expedite the evacuation of moisture by the use of heat such as by placing the molds in a hot atmosphere or by the use of fixed localized heating involving, for example, heating coils. These processes, however, do not insure a supply of heat which is proportional to the different moisture contents of different zones within the molds. Further, known drying procedures are rather lengthy and do not lend themselves readily to mass production techniques.

The invention, in view of the above-noted deficiencies, has as one of its primary objectives the provision of an improved apparatus whereby the evacuation of moisture from porous molds is greatly facilitated.

A further object of the invention is to provide an improved apparatus whereby a uniform drying is assured.

Yet another object of the invention is to facilitate the passage of moisture or fluid from a substance into an associated mold and from this mold into the ambient atmosphere.

To achieve the above and another of its objectives, the invention contemplates in accordance with a preferred embodiment thereof, the traversing of a porous mold, in which a moist substance is being shaped and set, by an electrical current. The moisture, it has been found, renders the mold conductive proportionally to the moisture content thereof, the zones having the most moisture being most conductive and therefore being provided with the most current and heat. Although the value of electrical current in processing settable substances has previously been recognized, the principle has not been applied to drying of a porous mold and thus the greatly enhanced production which the invention achieves has not heretofore been possible.

A feature of the invention is that, as a mold dries, its resistance to current flow automatically increases and thus the process is self regulating. This feature also makes the process of the invention economical.

With reference to the apparatus of the invention and, according to one aspect thereof, electrodes may be embedded in a porous mold for purposes of causing current to be passed through the latter.

According to another aspect of the invention, special provision can be made for coating the article being formed, this coating being applied to the mold and thence to the article.

Advantageously, an article having its coating applied in the manner indicated above is assured of a coating of uniform thickness. Moreover, the coating penetrates very intimately into the article to form an integral unit.

Further objects, features and advantages of the invention will be apparent from the following detailed description as illustrated in the accompanying drawing in which:

FIGURE 3 is a graph illustrating the results of the invention as applied to a particular mold.

As has already been indicated, the invention is concerned with treatment or shaping of a substance or material capable of being set by drying. Such a material may, for example, be a ceramic paste or barbotine or other such similar moist substance or fluid-containing material.

Figure 1:
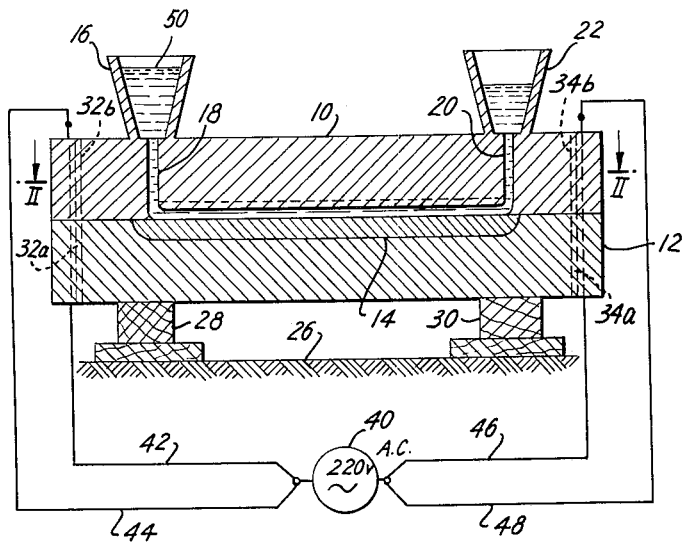
FIGURE 1 is a longitudinal sectional view of a molding apparatus provided in accordance with a preferred embodiment of the invention.
Figure 2:
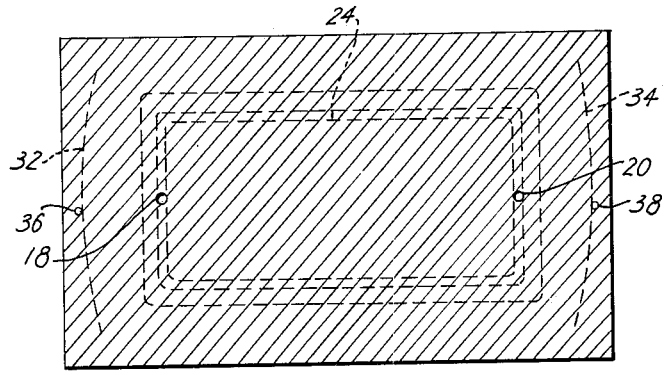
FIGURE 2 is a sectional view taken along line II—II of FIG. 1.

In FIGS. 1 and 2 is shown a mold apparatus provided in accordance with a preferred embodiment of the invention.

This apparatus comprises generally an upper mold portion 10 and a lower mold portion 12. The upper mold portion 10 is superposed on lower mold portion 12, the mold portion 12 being provided with a recess or cavity 14 of predetermined shape which corresponds to the shape of the piece to be produced. The recess 14 is intended to receive the material to be shaped and, for example, may have a configuration adapted to produce the lid of a tank.

Both mold portions constituting the mold are fabricated from a porous material adapted for absorbing moisture from the substance being processed. A typical material from which the mold portions may be made is plaster.

Supported on the upper mold portion 10 is a source 16 of the material to be molded. The source 16 is illustrated in the form of a hopper.

The upper mold portion 10 is provided with a feed passage 18 which is connected between the source 16 and the recess 14. The upper mold portion 10 is further provided with a discharge passage 20 by means of which excesses of material pass from the recess 14 into a reservoir 22 or the like. Passages 18 and 20 are connected by a passage 24 by means of which the barbotine, ceramic paste or the like is distributed evenly throughout the recess 14.

The mold may in entirety be supported on a floor 26 or the like by means of stands 28 and 30 consisting of appropriately disposed beams.

To prepare a mold apparatus in accordance with the invention, there are submerged or embedded, in the mold portion 12, electrodes 32a and 34a. Electrodes 32b and 34b are similarly located in mold portion 10. These electrodes, which are generally indicated by reference characters 32 and 34 in FIG. 2, are adapted to provide a flow of electrical current and are preferably in the form of a metallic gauze or mesh positioned on opposite sides of the recess 14. Connected to these electrodes are further electrodes or posts 36 and 38 by means of which electrical current is distributed to the first said electrodes.

In further accordance with the invention, there is provided a source 40 of electrical power or potential which may, for example, be a source of two hundred and twenty volts. Other voltages may also be used. It is also possible, for example, to employ a source of polyphase voltage in which event additional electrodes will be employed to take advantage of the various phases.

The source 40 may be coupled to the electrodes 32a and 32b by means of parallel lines 42 and 44 and to electrodes 34a and 34b by lines 46 and 48. This assures a proper distribution of current to the above-noted electrodes.

According to the invention, a charge 50 of barbotine, moist ceramic paste or the like is supplied to the hopper 16. This moist substance passes through the passageway 18 into the recess 14, the excess passing upwardly via passageway 20 into reservoir 22. The water in this settable substance is absorbed by the porous material of the mold portions 10 and 12 which other than for this moisture content are substantially non-conductive or have a high resistance with respect to electrical current.

The presence of moisture, however, in the cells of the porous material provides paths of decreased resistance and renders the material conductive. The greater the moisture content in any particular zone of the upper and lower mold portions, the greater the conductivity thereof. Accordingly, these portions which require drying the most are those portions which receive the most current.

The current passing through the mold portions generates heat. This heat hastens the discharge or evacuation of moisture from the porous material of the mold portions. Moreover, this heat is applied to the substance being treated and decreases the viscosity of the moisture such that passage of the moisture from the material being shaped and set passes more readily into the mold and from the mold into ambient atmosphere.

Reference to FIG. 3 will indicate the results for the processing of a block of moist plaster having the dimensions of 240 x 50 x 20 millimeters, an alternating-current voltage of the magnitude of 220 volts being applied to the small faces of the block.

In FIG. 3, curve 52 represents the temperature within the block, this temperature rising to a maximum at A which is about 20-25 minutes following the application of the voltage and thereafter decreasing to a substantially constant value.

Curve 54 represents the resistivity of the block, it being seen that the resistivity increases with time. As the block becomes substantially dry, the rate of increase of the resistivity becomes extremely great.

Curve 56 represents the flow of current, it being seen that the flow of current tapers off as the resistivity increases. This characteristic illustrates the fact that the process of the invention is self-regulating, the amount of current consumed being reduced automatically as the process continues towards its terminal period.

Curves 58 and 60 illustrate respectively the percentage of water remaining in the block and the amount of water which is evaporated.

It is to be noted that, in the event one area of the mold should dry more rapidly than another area, the current intensity in the drier area would diminish compared to the current in the wetter area and, consequently, less heat would be produced in the drier area. This assures an over-all uniform drying of the mold areas and a uniform drying of the product which in turn results in an article of manufacture which is substantially free of undesired stresses.

It has been found that, in accordance with the invention, it is possible to impart to a mold higher temperatures than heretofore achieved by resort to conventional methods. It follows as a natural result that a much higher output is obtained by the invention than with conventional techniques. At the same time the self-regulating characteristic of the invention obviates all risk of improper treatment of the materials.

As regards the particular mold constructions of the invention, these may be employed as long as they remain porous and it has been found that plaster is well suited to providing molds of extremely long life. Also, the invention is applicable to all forms and sections of molds required to form a particular product. That is, the mold may be in two or more portions and each portion may be recessed or only some portions recessed, depending upon the shape of the product to be produced.

According to a further feature of the invention, there is contemplated the manufacture of articles provided with coatings such as enamel.

Thus, according to the invention, it has been found feasible to introduce liquid enamel into the recess of the lower mold portion 12 via source 16 and/or reservoir 22. After a setting period, the enamel is drained, sufficient enamel remaining behind to cover completely the wall defining said recess.

After a short drying period, the barbotine or ceramic material is then poured into the mold over the enamel following which electric current is caused to traverse the mold in the manner described above. As a result, water or moisture is evacuated from the substance being processed and is passed through the liquid enamel into the porous material and thence into the ambient atmosphere.

It has been found that enamel, when so applied, has an excellent penetration into the surface layer of the resulting ceramic piece and forms an integral coating thereon in a very uniform manner.

From the above, it will be apparent that the invention readily achieves its objective of providing an improved process whereby a uniform drying is assured. It will also be apparent that the invention provides articles of manufacture having improved strain patterns. Furthermore, it will be understood that the techniques of the invention facilitate the passage of moisture or fluid from a substance being molded into the associated mold and from this mold into the ambient atmosphere.

It will also be apparent that the invention provides improved coatings for ceramic articles and the like.

It should also be noted that, although a preferred embodiment of the invention has been described and illustrated, it is possible to substitute for electrodes 32 and 34 other electrodes applied to the outside of the mold and which are not submerged therein. Moreover, it is possible to increase the number of electrodes and vary the positions thereof with respect to the mold.

There will now be obvious to those skilled in the art many modifications and variations of the methods and structures set forth above. These modifications and variations will not however depart from the scope of the invention if defined by the following claims.

What is claimed is:

1. A porous normally dry nonconductive mold for shaping a moist substance comprising a recess in the mold for receiving the moist substance and absorbing water therefrom, the conductivity of the mold increasing as its moisture content increases and electrodes in opposed relationship in said mold for passing an electric current from one electrode to the other through said porous mold when moist to remove moisture from said mold.

2. A porous normally dry nonconductive mold for shaping a moist substance comprising a recess in said mold for receiving the moist substance and absorbing water therefrom, the conductivity of the mold increasing as its moisture content increases and metal gauze electrodes embedded in opposed relationship in said mold for passing an electric current from one electrode to the other through said porous mold when moist to remove moisture from said mold.

3. A porous normally dry nonconductive mold for shaping a moist substance comprising a recess in said mold for receiving the moist substance and absorbing water therefrom, the conductivity of the mold increasing as its moisture content increases, metal gauze electrodes imbedded in opposed relationship in said mold on opposite sides of said recess and spaced therefrom for passing an electric current from one electrode to the other through said porous mold when moist to remove moisture from said mold.

4. A porous mold as claimed in claim 3, wherein said mold comprises a lower mold portion, an upper mold portion superimposed on said lower mold portion, and wherein said recess is located in said lower mold portion.

5. A porous mold as claimed in claim 4, wherein said upper mold portion is provided with a feed passage and a discharge passage connected by an intermediate passageway overlying said recess to permit the moist substance to be evenly distributed in the recess.

References Cited by the Examiner

UNITED STATES PATENTS

| | | | |
|---|---|---|---|
| 838,496 | 12/1906 | Bigot. | |
| 1,534,155 | 4/1925 | Butler | 25—129 |
| 1,536,358 | 5/1925 | Stacey | 25—129 |
| 1,565,460 | 12/1925 | Hunt | 25—129 |
| 1,656,423 | 1/1928 | Copeman. | |
| 1,862,191 | 6/1932 | Meth | 25—156 |
| 1,924,648 | 8/1933 | Merriam | 264—27 |
| 1,984,059 | 12/1934 | Dandini | 18—60 |
| 2,026,624 | 1/1936 | Flower. | |
| 2,341,617 | 2/1944 | Hull. | |
| 2,522,298 | 9/1950 | Ramsay | 18—47.5 |
| 2,846,655 | 8/1958 | Iversen | 264—86 |
| 2,890,491 | 6/1959 | Hendry | 18—30 |
| 2,964,822 | 12/1960 | Tompicins | 25—156 |
| 2,964,823 | 12/1960 | Fredrickson | 25—156 |
| 2,984,887 | 5/1961 | Thiess. | |

J. SPENCER OVERHOLSER, *Primary Examiner.*

ROBERT F. WHITE, ALEXANDER H. BRODMERKEL, MICHAEL V. BRINDISI, WILLIAM J. STEPHENSON, *Examiners.*

G. A. KAP, R. B. MOFFITT, *Assistant Examiners.*